Nov. 17, 1931.  F. A. HART  1,831,907
BUS TOP
Filed Feb. 1, 1930   3 Sheets-Sheet 1
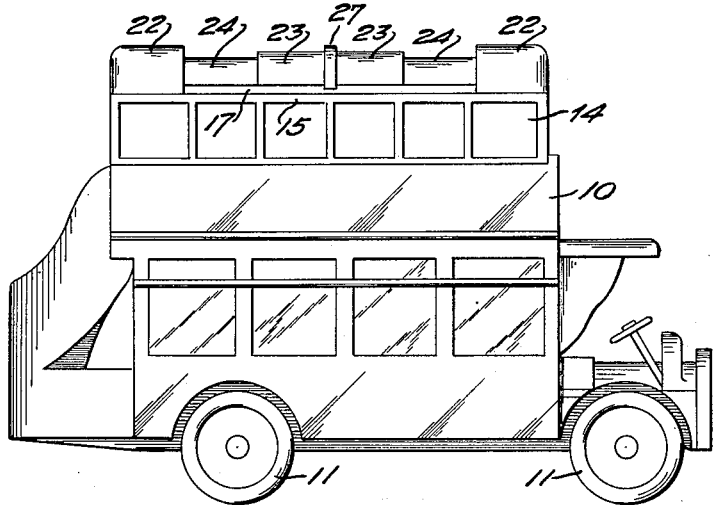
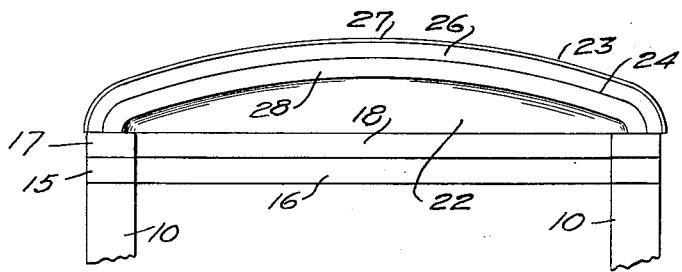
INVENTOR.
Fred A. Hart
BY
J. Kaplan
ATTORNEY.

Nov. 17, 1931.  F. A. HART  1,831,907
BUS TOP
Filed Feb. 1, 1930  3 Sheets-Sheet 2
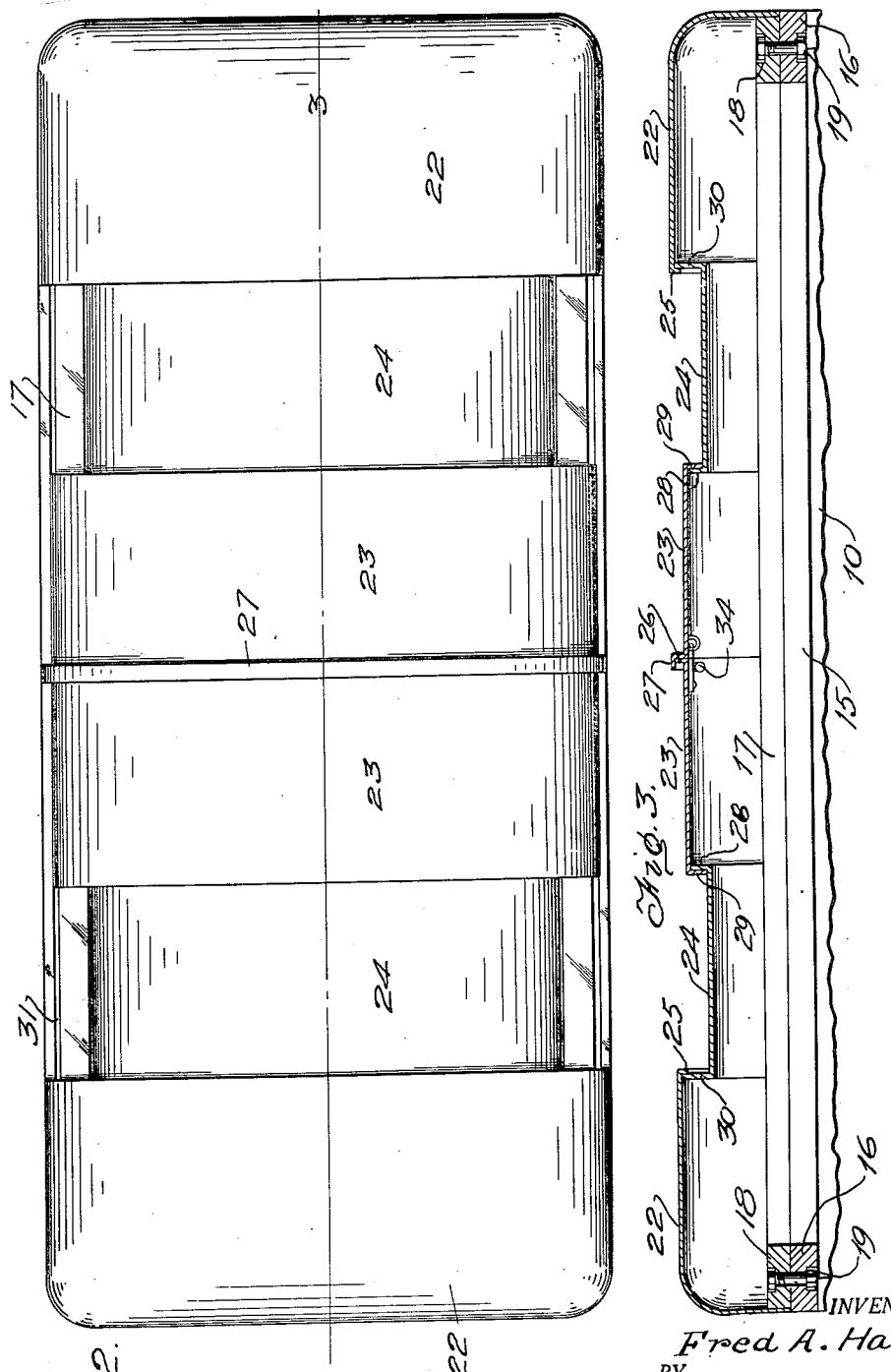
INVENTOR.
Fred A. Hart
BY
J. Kaplan
ATTORNEY.

Nov. 17, 1931.  F. A. HART  1,831,907
BUS TOP
Filed Feb. 1, 1930  3 Sheets-Sheet 3
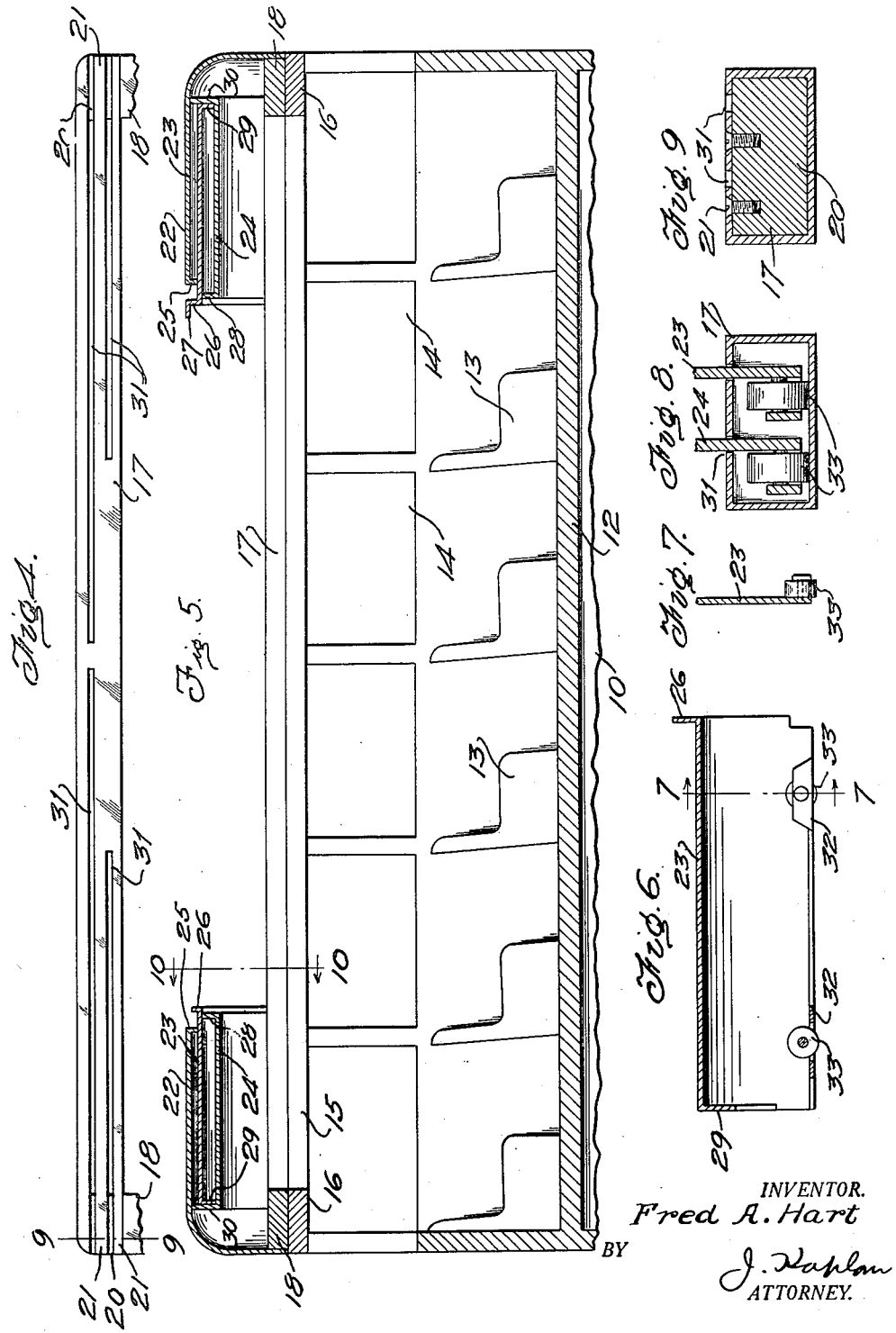
INVENTOR.
Fred A. Hart
BY
J. Kaplan
ATTORNEY.

Patented Nov. 17, 1931

1,831,907

UNITED STATES PATENT OFFICE

FRED A. HART, OF NEW YORK, N. Y.

BUS TOP

Application filed February 1, 1930. Serial No. 425,253.

This invention relates to vehicles and has special reference to a telescopic vehicle top especially adapted for omnibuses and other motive or like vehicles having long bodies.
In vehicles of this class it is frequently desirable in pleasant weather to have the top open and this is especially true with regard to so called "double decked busses" many people preferring to ride on the upper deck to get the benefit of air and sunshine. Nevertheless, in inclement weather, the upper decks of such vehicles are generally deserted when of permanently open construction, the passengers crowding into the lower deck space to avoid rain, snow and the like.
One important object of the present invention is to provide an improved and novel arrangement of top which may be opened in fair weather and securely closed in bad weather.
A second important object of the invention is to provide a top of this character having a novel arrangement of telescopic parts or sections.
A third important object of the invention is to provide a novel means for supporting the top sections so that they cannot be blown off or otherwise accidently removed from the vehicle.
A fourth important object of the invention is to provide an improved arrangement of such sections wherein storm tight joints are provided between adjacent sections when in position to close the top.
A fifth important object of the invention is to provide a novel means of supporting and guiding the sections so that they may be easily operated.
A sixth important object of the invention is to provide an improved roof of the above character, principally for application to motor omnibuses and like vehicles which may be quickly and easily manipulated by one person so as to convert the upper or top deck of the vehicle into either an open or closed compartment according to the condition of the weather.
A roof according to the present invention is composed of a plurality of telescoping and longitudinally movable sections and fixed end sections. The fixed end sections are of curved or flattened U section arranged one at each end of the vehicle and extending laterally from one side of the same to the other. The remaining or intermediate sections are of similar cross-section to the fixed sections and are arranged to form two units each and when extended serve to cover one-half of the omnibus top. The intermediate sections of each unit are adapted to rest one within the other when closed; in which position the units are contained within their respective sections. The sections are mounted to run along tracks so that they can move easily from or into their extended position.
With the above and other objects in view the invention consists in general of certain novel details of construction and combinations of parts hereinafter fully described, illustrated in the accompanying drawings and specifically claimed.
In the accompanying drawings like characters of reference indicate like parts in the several views, and:—
Figure 1 is a side elevation of a double decked omnibus having a top constructed in accordance with this invention.
Figure 2 is an enlarged plan view of the vehicle top.
Figure 3 is a longitudinal median section through the top on the line 3—3 of Figure 2 and with the latter closed.
Figure 4 is a plan view of one of the side members of the top frame.
Figure 5 is a view similar to Figure 3 but with the top open and the upper deck of the vehicle disclosed.
Figure 6 is a detail longitudinal section through one of the telescoping top sections.
Figure 7 is a section on the line 7—7 of Figure 6.
Figure 8 is an enlarged detail cross section through one of the top frame side members showing the rollers for supporting the top sections.
Figure 9 is an enlarged detail section on the line 9—9 of Figure 4.
Figure 10 is a section on the line 10—10 of Figure 5.

In the embodiment of the invention here shown there is provided a vehicle of the double decked type having a body 10 and wheels 11. The upper deck 12 supports the seats 13 and is provided with side windows 14. The upper frame of the body has the usual longitudinal side members 15 and transverse end members 16.

The improved top includes a top supporting frame arranged to fit on the upper frame of the body and like it provided with longitudinal side members 17 and transverse end members 18 connecting these side members. This top frame is firmly secured to the body frame by bolts 19 or other suitable means. Each side frame member 17 is of tubular form, rectangular in cross section and of somewhat greater width than height. Each end of these side members has a closure 20 fitted therein and secured by the screws 21.

Fixed top sections 22 are mounted on and secured to the top frame at its ends, these sections being transversely arched from side to side and each being also arched up from the respective frame end 18 towards the remaining fixed section. These sections thus form flat semi-dome like structures open at their bottoms and also having their proximal or confronting ends open. As here shown two telescopic top sections are associated with each fixed top section but it is to be understood that no restriction is to be placed on the number of telescopic sections that may be employed at each end, the principles of the construction being as well shown with two as though sections had been shown. When closed as shown in Figures 1 and 2 two of these sections rest in the middle of the frame and, being in this position remote from the end sections are termed outer sections and are shown at 23. Similarly the remaining telescopic sections 24 lie close to the respective end sections and are termed for convenience the inner telescopic sections.

Each end section is provided at its open end with an internal flange 25. Each outer sections 23 is arched to fit within said flange and is provided at its outer end with an upstanding flange or rib 26 which strengthens the section at this end. These ribs engage against each other in closed position of the top and the forward rib is provided with a rearwardly extending flange 27 which overhangs the rear rib 26 in such closed position to keep out rain. Similarly the outer end of each section 24 is provided with an upstanding rib 28 fitting the interior of the respective section 23. A depending rib 29 is provided on the inner end of each section 23 for engagement with the rib 28 of the companion section 24 so as to make a rain tight joint between these two sections when the top is closed. Finally each section 24 is provided with an upstanding rib 30 at its inner end for engagement with the respective rib 26.

The top of each side member 17 is provided with parallel longitudinally extending slots of proper lengths to form stops for the depending side edges of the members 23 and 24 which pass downwardly through these slots and are provided with flanged portions 32 at their bottom edges to prevent the sections 23 and 24 from becoming detached from the members 17. Also rollers 33 are mounted on said flanges 32 and normally rest on the bottoms of the members 17 to make the sections easy of operation. A latch 34 of any desired construction is used to hold the outer sections 23 together when the top is closed.

With this construction it is easy to change the upper deck between closed and open condition and when open practically all the passengers except those on the forward seat on each side may look upwardly while all will be able to benefit by the open air side.

Thus there has been provided a simple and efficient device of the kind described and for the purpose specified.

It is obvious that changes may be made in the form and construction of the invention without departing from the principles involved. It is not, therefore, desired to confine the invention to the exact form here shown and described but it is desired to include all such as come within the scope claimed.

Having thus described the invention, what is claimed as new, is:—

1. In a bus top of the class described, the combination of a fixed section associated with two slidable sections, said slidable sections adapted to telescope one above the other and underneath said fixed section, said fixed section having a downwardly bent flange engaging the top surface of the middle section, said middle section having a downwardly bent flange engaging the top surface of the bottom section, and said bottom section having an upwardly bent flange at each end engaging the bottom faces of said top and middle sections respectively.

2. In a bus top of the class described, the combination of a fixed section associated with two slidable sections, said slidable sections adapted to telescope one above the other and underneath said fixed section, said fixed section having a downwardly bent flange engaging the top surface of the middle section, said middle section having a downwardly bent flange engaging the top surface of the bottom section, said bottom section having an upwardly bent flange at each end thereof, one of said flanges being deeper than the other flange, said deeper flange engaging the under surface of said fixed section and the shallower flange engaging the under surface of said middle section.

In testimony whereof I affix my signature.

FRED A. HART.